United States Patent [19]
Clement

[11] 4,134,509
[45] Jan. 16, 1979

[54] VEHICLE TOP LOADER MECHANISM

[76] Inventor: Clyde H. Clement, 8439 N. 13th Pl., Phoenix, Ariz. 85020

[21] Appl. No.: 801,025

[22] Filed: May 27, 1977

[51] Int. Cl.² .............................................. B60R 9/00
[52] U.S. Cl. ............................... 214/450; 224/42.1 H
[58] Field of Search .................... 214/450; 224/42.1 H

[56] References Cited

U.S. PATENT DOCUMENTS

| | | | |
|---|---|---|---|
| 3,718,225 | 2/1973 | Duren | 214/450 |
| 3,819,074 | 6/1974 | Oliver | 214/450 |
| 3,823,839 | 7/1974 | Petzing et al. | 214/450 |
| 3,878,955 | 4/1975 | Udden | 214/450 |
| 4,039,096 | 8/1977 | McAllister | 214/450 |

Primary Examiner—Albert J. Makay
Assistant Examiner—Ross Weaver

[57] ABSTRACT

A loader mechanism particularly suited for loading and unloading wheelchairs from a carrier mounted on top of a vehicle automatically lifts the wheelchair from a position adjacent the driver's door and pulls it up into and stores it within the vehicle top carrier. When use of the wheelchair or other object stored in the carrier is desired, the procedure is reversed and the system automatically unloads and places the wheelchair or other object alongside the door of the vehicle so that it then can be used.

5 Claims, 9 Drawing Figures

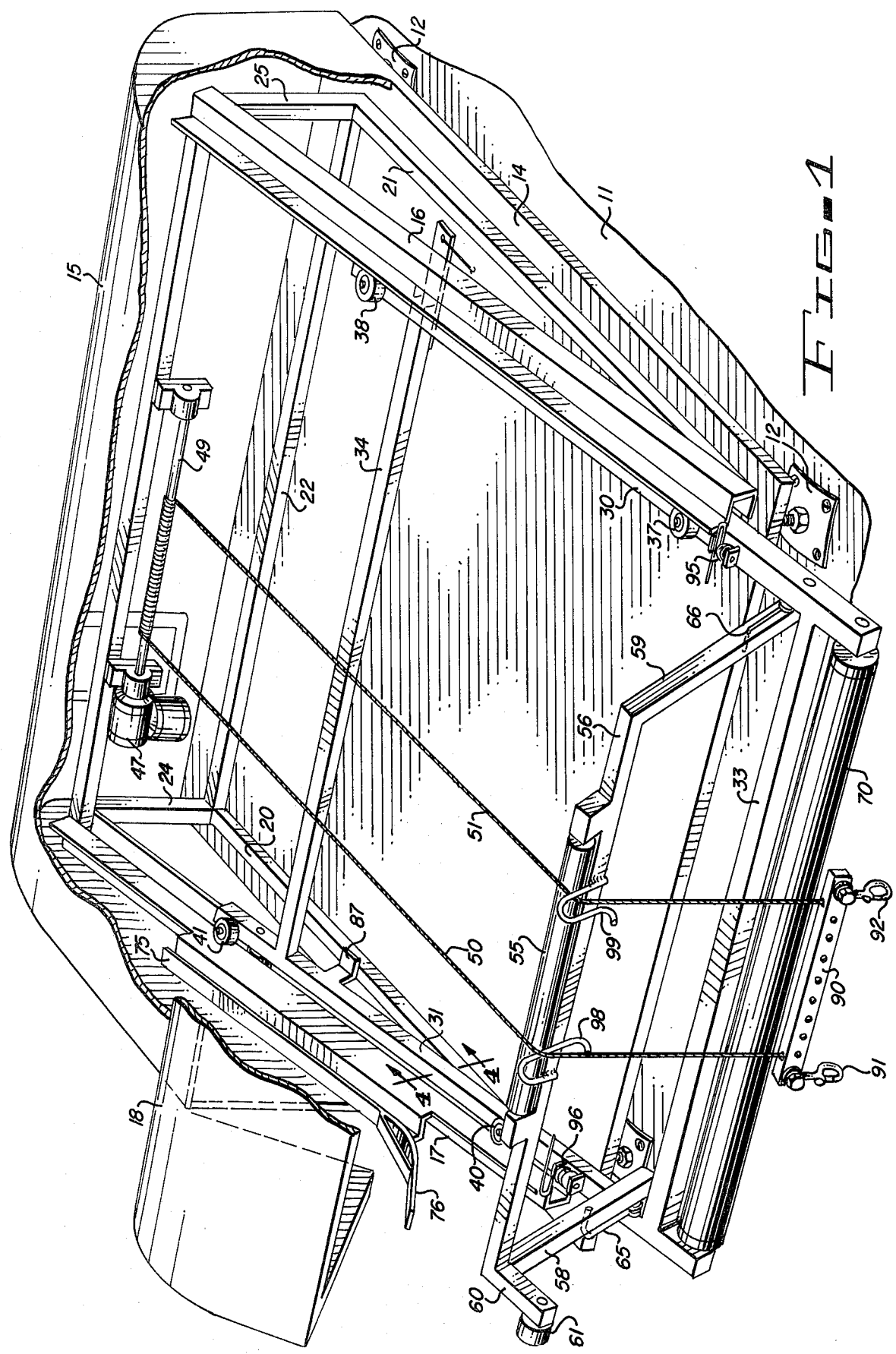

VEHICLE TOP LOADER MECHANISM

CROSS REFERENCE TO INVENTION DISCLOSURE

The present application pertains to and arises from material submitted to the United States Patent Office on Nov. 18, 1976 in invention disclosure No. 054330.

BACKGROUND OF THE INVENTION

Today, millions of people are confined to wheelchairs in the United States, and this number increases daily through automobile accidents, various diseases and old age. Many of these people drive automobiles or could drive automobiles if some suitable provision could be made for loading and unloading the wheelchair from the automobile; so that the person using the wheelchair could slide off the automobile seat onto the wheelchair and vice versa. At the present time, persons who use wheelchairs and who also are not capable of loading the wheelchairs into the trunk of an automobile, that is, capable of at least some limited use of their legs to walk from the trunk of the automobile to the door at the driver's side, are confined to the use of relatively large two door automobiles. The reason for this is that in large two door automobiles, the door extends past the front seat, and the wheelchair user then can grasp the wheelchair, lean forward in the seat pulling it forward with him and push or shove the wheelchair into the space between the seats. A similar contortion is necessary in order to take the wheelchair from behind the seat and place it alongside the seat so that the person may use it. Obviously, a great deal of physical exertion is required to do this manuever for a person sitting in the front seat of the automobile; so that frail persons or persons who do not have a great deal of strength in their arms cannot avail themselves of this technique.

For persons who are unable to use a two door sedan and store a wheelchair behind the front seat of the sedan, the only other alternative available in the prior art is with specially equipped vans having hydraulic lifts and the like for loading and unloading persons in wheelchairs from the van. Once such a person is within the van, he then can transfer himself from the wheelchair to the driver's seat if desired. The initial cost of such vans, even without the conversion equipment, is quite high; and when the hydraulic lifts and other paraphernalia is added to the van, the resultant cost is nearly prohibitive to most people.

Clearly there exists a need for a wheelchair loader which can be used with all types of cars or trucks, including gas-saving subcompact automobiles, pickup trucks, station wagons, and four door sedans. There also is a need for a wheelchair loader capable of use with any motor vehicle presently being manufactured which also is low in cost, so that persons of limited incomes can afford to install such a wheelchair loader on the car or truck of their choice.

SUMMARY OF THE INVENTION

Accordingly, it is an object of this invention to provide an improved object loading apparatus for motor vehicles.

It is another object of this invention to provide an improved wheelchair loading apparatus for motor vehicles.

It is an additional object of this invention to provide an improved wheelchair loading apparatus mounted on the top of a motor vehicle.

It is a further object of this invention to provide an improved wheelchair loading apparatus which may be used with a wide variety of automobiles and which is mounted on the roof for loading and unloading wheelchairs from a position adjacent the driver's seat.

In accordance with a preferred embodiment of this invention, an improved loader is designed for mounting on the top of the motor vehicle for raising an object such as a wheelchair from alongside the vehicle to its top and for lowering such an object from the top of the vehicle to the ground alongside the vehicle. The loader includes an extendable frame which supports the wheelchair or other object on the loader on top of the vehicle. When the wheelchair or other object is to be unloaded from the loader, a portion of the frame is used to position the wheelchair at a point where it may be lowered to the ground from the loader. A cable which is attached to the wheelchair then is unwound to lower the wheelchair to a position adjacent the driver's seat of the vehicle. The control of the winding and unwinding is effected by the driver from a convenient position in the vehicle, such as by a switch mounted on the dashboard. When the wheelchair is positioned on the ground adjacent the driver's seat, the cable is disconnected and the wheelchair may be used. The procedure is reversed to load the wheelchair into the loader.

BRIEF DESCRIPTION OF THE DRAWINGS

FIG. 1 is a partially cut-away perspective view of a preferred embodiment of the invention;

DETAILED DESCRIPTION

Figure 2A:
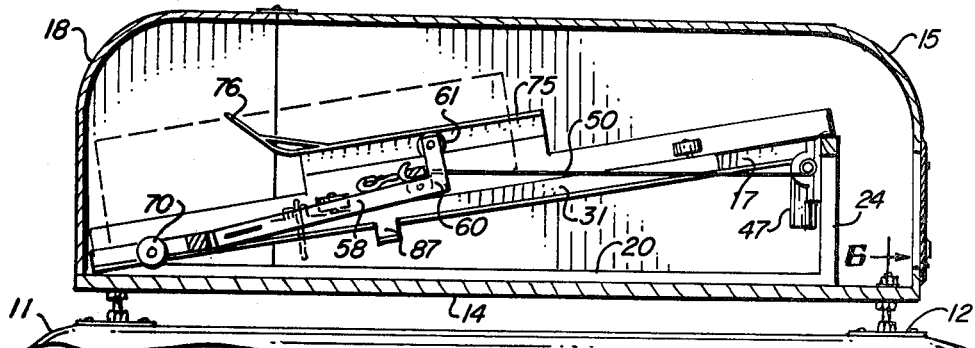
FIGS. 2A through 2D are a cross-sectional diagrammatic view of the embodiment in FIG. 1 shown in different stages of its operation.

Reference now should be made to the drawings in which the same reference numbers are used throughout the several figures to designate the same components. FIG. 1 is a partially cut-away view of a preferred embodiment of a wheelchair loader attached to the roof 11 of an automobile by means of four corner mounts 12 attached to a bottom platform 14 of the loader apparatus. The apparatus of the loader is encased in a cover 15 which has a hinged opening 18 extending all along the side of the loader which is located above the door of the side of the motor vehicle where the wheelchair is to be loaded and unloaded. The loader mechanism itself comprises an extendable frame having a pair of parallel fixed side frame members 16 and 17 which are attached to an underlying generally wedge-shaped base frame member having a pair of lower parallel side members 20 and 21 interconnected by a cross member 22, all attached to the base 14 of the loader assembly. At the corners of attachment of the members 20, 21 and 22 are a pair of upright posts 24 and 25 which are attached to the inner ends of the side frame members 16 and 17, respectively. The other ends of the frame members 16 and 17 are attached by some suitable means, such as welding, to the opposite ends of the members 20 and 21; so that the extendable frame assembly is mounted at an angle of approximately 15° inside the housing 15. This is shown most clearly in the partially cut-away side view representations of FIGS. 2A through 2D.

The side frame members 16 and 17 have a pair of movable extension members 30 and 31 interconnected by a pair of cross support members 33 and 34 to form a rectangular movable frame extension. This frame extension moves from a closed or unextended position, as shown in FIG. 2A, to a fully extended position as shown in FIGS. 1, 2C and 2D on vertical and horizontal rollers of a conventional type. These rollers roll within channels formed in the side frame members 16 and 17 and which abut against an upper flange of the side frame members 16 and 17 for a nearly friction-free movement of the extendable frame portion comprising the members 30 and 31 and the support members 33 and 35. The horizontal rollers which engage the upturned flanges on the fixed side frame members 16 and 17 comprise a pair of rollers 37 and 38 on the extension member 30 and a pair of rollers 40 and 41 on the extension channel member 31. The horizontal rollers are located within the channels of the fixed members 16 and 17, as shown most clearly in FIG. 4 which illustrates one of these vertical rollers 45 located within the channel formed in the member 17.

A small reversible electric motor 47 is used to supply all of the power and all of the motion needed for operating the loader mechanism. This motor rotates a shaft 49 in either direction to release or take up a pair of cables 50 and 51. Both of these cables extend over a roller 55 which is mounted on the cross member 56 of a generally U-shaped auxiliary lifting frame member comprised of the cross member 56 and a pair of side legs 58 and 59. Each of the legs 58 and 59 is pivotally mounted at its other end to the respective ones of the extension frame members 30 and 31. The U-shaped lifting frame also has an extension 60 attached to the corner at the junction of the cross member 56 and the leg 58 and carrying a roller 61 at its free end.

The lifting frame 56, 58, 59 is normally biased to its upright or extended position as shown in FIGS. 1, 2C and 2D by means of a pair of biasing springs 65 and 66, shown most clearly in FIG. 1. In this position, the extensions 58 and 59 abut against the edge of the cross member 33; so that any force applied to the cross bar 56 in a generally leftward direction as viewed in FIGS. 1 and 2, causes the lifting frame member 56, 58, 59 to be a very rigid support member extending upwardly from the plane of the extension frame 30, 31, 33 and 34. A relatively large roller 70 is pivotally mounted adjacent the cross member 33 and extends all the way across the extendable frame parallel to this cross member.

Figure 4:
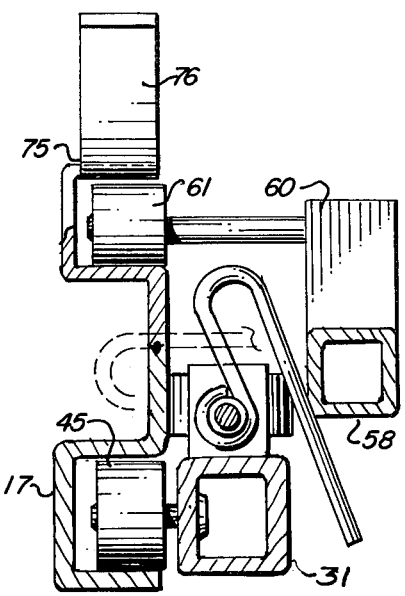
FIG. 4 is a detailed view of another portion of the apparatus shown in FIGS. 1 and 2.

The operation of the wheelchair loading device will now be discussed primarily in conjunction with FIG. 2, but reference also should be made to FIGS. 1, 4 and 5. Assume initially that a wheelchair is loaded in place inside the device on top of the vehicle. In this position the wheelchair occupies generally the space indicated by the dotted lines in FIG. 2A. The wheelchair itself has not been shown since it is believed that to do so would unnecessarily clutter the drawing and obscure the details of the operation of the apparatus shown in FIGS. 1 and 2. In the loaded position, the extension frame members 30 and 31 are pulled inwardly and upwardly toward the right, as viewed in FIGS. 1 and 2, to cause their outermost ends to be coextensive with the outermost or left ends of the fixed side frame members 16 and 17. In this position, the lifting frame 56, 58 and 59 is folded downwardly to the position shown in FIG. 2A, and the roller 61 engages the underside of a flange 75 which is formed as a part of and extends above the channel member 17. The left end of the flange 75 is an upwardly flaired portion 76 which is used to guide the roller 61 into the track provided by the flange 75 during a loading operation of the apparatus.

Assume now that unloading of the wheelchair carried in the apparatus is desired. In this event, the motor 47 is operated in a direction to unreel the cables 50 and 51 from the shaft 49. When this occurs, the weight of the extension frame members 30, 31, 33 and 34 along with the weight of the wheelchair which is carried by it, causes the extendable frame to slide generally downwardly toward the left under the pull of gravity. As this occurs, the lid 18 of the cover 15 begins to open as shown in FIG. 2B to permit the leftmost end of the frame carrying the roller 70 to extend outwardly toward the left beyond the edge of the platform 14 on which the apparatus is mounted.

Figure 5A:
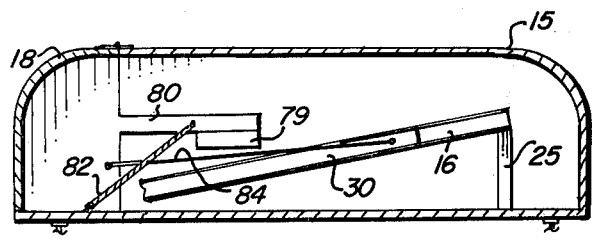
FIGS. 5A and 5B are a diagrammatic representation of the mechanism used to open the lid of the cover over the apparatus shown in FIG. 1.
Figure 5B:
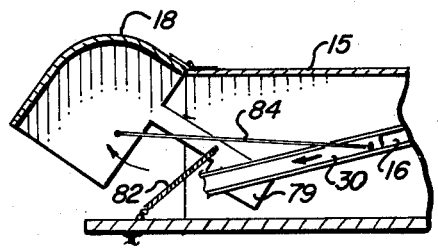

The manner in which the lid 18 is permitted to open is illustrated most clearly in the diagrammatic representation of FIGS. 5A and 5B. A counterweight 79 is attached to the hinged cover lid 18 on a lever arm 80, which also has a coil spring 82 attached to it. The weight 79 and spring 82 tend to bias the lid 18 to its open position, as is apparent from an examination of FIGS. 5A and 5B. When the apparatus, however, is in its closed position with the extendable frame non-extended, a cable 84, which is attached between the movable frame member 30 and the cover 18, pulls the cover 18 to the closed position shown in FIG. 5A against the biasing of the spring 82 and counterweight 79. As the extension frame member 30, however, moves outwardly toward the left as viewed in FIG. 5, the cable 84 also moves toward the left and permits the spring 82 and weight 79 to pull open the cover 18 as shown in FIG. 5B. Thus, the cover 18 opens as the extendable frame moves downwardly toward the left to position the wheelchair or other object to be unloaded in a position to clear the side of the vehicle on which the carrier is mounted.

Figure 2B:
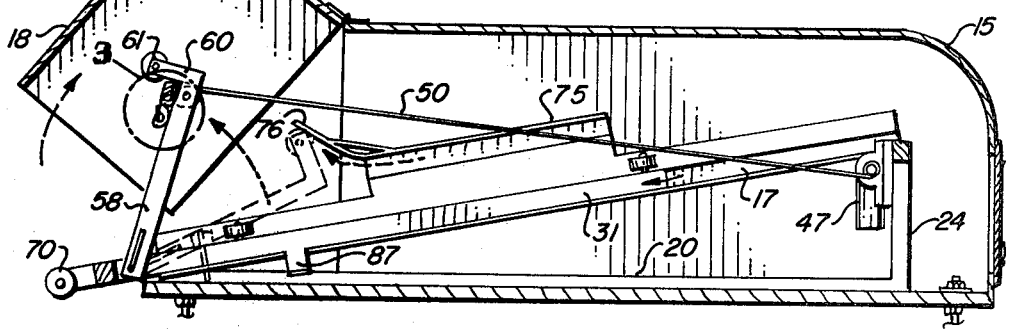
Figure 2C:
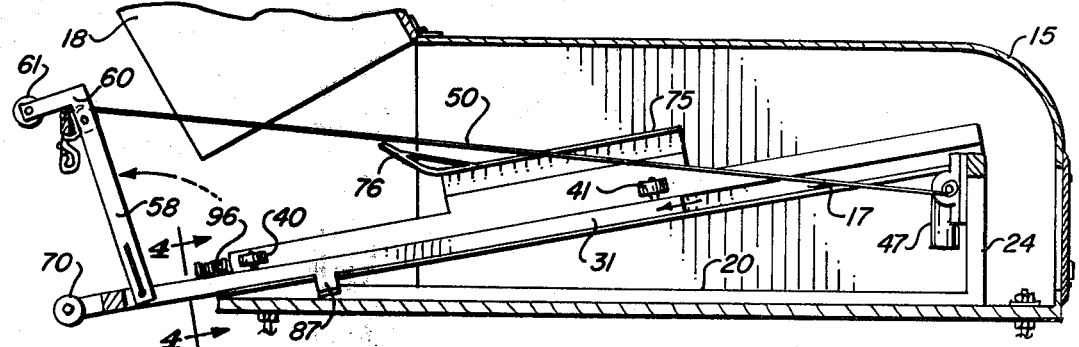
Figure 2D:
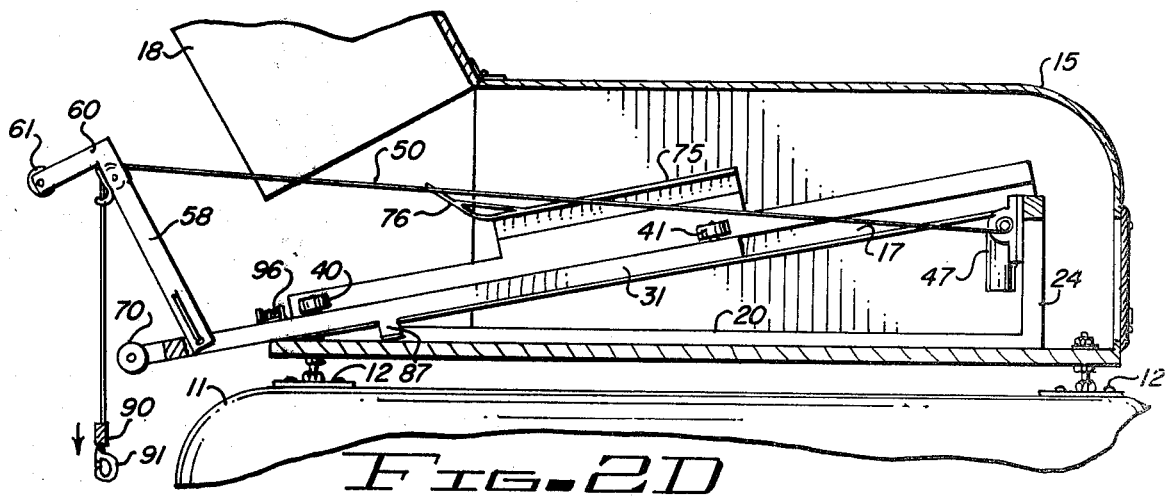

As the extendable frame portion moves toward the left, the guide roller 61 on the arm 60 of the lifting frame member follows along the channel 75 and upwardly, as shown in the dotted line position of FIG. 2B, along the guide flange 76 to permit its release as the cables 51 and 52 continue to be unwound. The spring bias on the lifting frame member 56, 58, 59 is sufficient to lift the member to the position shown in FIG. 2B as continued unwinding of the cables 50 and 51 takes place. When the legs 58 and 59 reach the position shown in FIG. 2C, the load is lifted into position for its release; and the final extension of the extendable frame portion 30, 31, 33 and 34 occurs when an abutment flange 87 attached to the member 31 makes contact with the base 14 as shown in FIG. 2C. This flange also could be positioned to make contact with a similar mating abutment attached to the fixed frame member 20 or to the base 14 in any suitable manner. In any event, after this position is reached, continued release of the cables 50 and 51 results in a lowering of the load attached to the guide bar 90 by a suitable fastening means such as the hooks 91 and 92 as illustrated in FIG. 2D. The roller 70 facilitates in the movement of the wheelchair or other object being unloaded past the end of the extension frame member. As shown most clearly in FIGS. 8A, 8B and 9, the load may be deposited alongside the driver's seat of the vehicle with which it is being used.

Once the wheelchair has reached a position on the ground next to the driver's seat of the vehicle, the hooks 91 and 92 may be released and the frame apparatus then can be returned back into the loader until it is needed again. The return of the frame apparatus unloaded, as shown in FIGS. 1 and 2, or carrying a wheelchair to be returned back into the carrier on top of the vehicle is the same in either case. The direction of rotation of the shaft 49 by the motor 47 is reversed to take up or wind up the cables 50 and 51. This results in a reversing of the steps illustrated in FIGS. 2A through 2D.

To prevent premature closure of the lid 18 and to allow the lifting member 56, 58 and 59 to be folded down into position prior to collapsing of the extendable frame, however, a pair of spring loaded catches 95 and 96 are attached to the extension side frame members 30 and 31, respectively. These catches normally are biased to the position shown in FIG. 1 in solid lines and to the dotted line position shown in the detailed view of FIG. 4 (which illustrates the catch 96). Each of these catches are made of spring steel wound around a mounting shaft to bias the loop in the respective catches so that it overlies the upturned flanges on the top of each of the fixed side frame members 16 and 17. In this position, the movable frame members 30 and 31 are prevented from moving upwardly toward the right in the illustration of the apparatus shown in FIGS. 1 and 2.

Thus, when the bar 90 engages a pair of inwardly turned hook members 98 and 99, each having a loop through which the cables 50 and 51 pass, the bar 90 tends to pull toward the right and to fold the lifting frame member 56, 58, 59 downwardly against the bias of the springs 65 and 66. This occurs from the position shown in FIG. 2C until the side members 58 and 59 fold downwardly to the dotted line position shown in FIG. 2B. When this occurs, each of these side members engage the inwardly extending arms of the spring catches 95 and 96 to press them downwardly to the solid line position shown in FIG. 4, thereby releasing the catches from their latching position overlying the ends of the flanges on the fixed side frame members 16 and 17. This occurs at the point where the roller 61 on the arm 60 underlies the left end of the upturned flange 76, illustrated most clearly in FIGS. 1 and 2. This particular position is shown in dotted lines in FIG. 2B.

As a consequence, continued winding up of the cables 50 and 51 now causes the entire extendable frame 30, 31, 33 and 34 to move to the right under the pull of the cables. The flange 76 and channel 75 continue to press downwardly on the lifting frame member by way of the rollers 61 and arm 60 against the bias of the springs 65 and 66 until the entire apparatus is in its collapsed or non-extended position shown in FIG. 2A. Termination of the operation then can be effected manually or automatically in response to a sensing of the closed position of the extendable frame member by a limit switch. At the same time, the door 18 is closed by the urging of the cable 84, again in the reverse order of the operation which has been described previously for opening this door to permit unloading of objects from the apparatus.

Figure 8A:
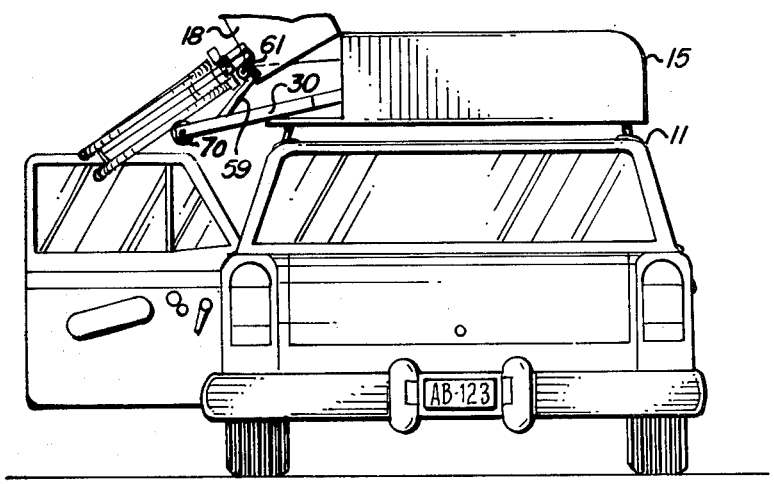
FIGS. 8A, 8B and 9 illustrate the manner in which the loader operates to place the wheelchair alongside the driver's seat for loading and unloading purposes.
Figure 8B:
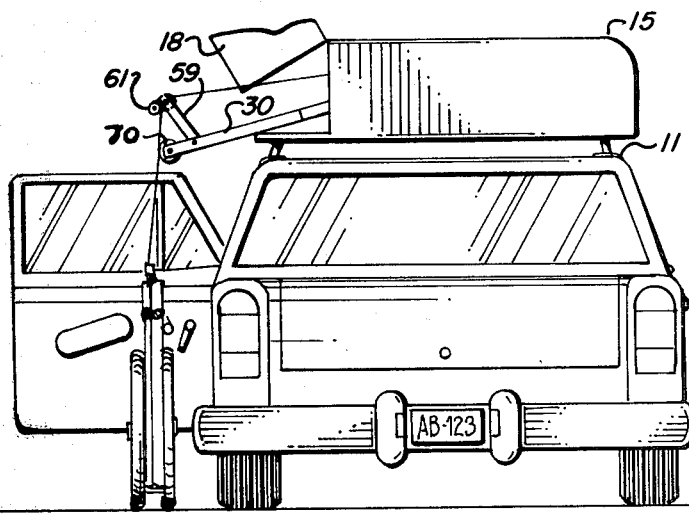
Figure 9:
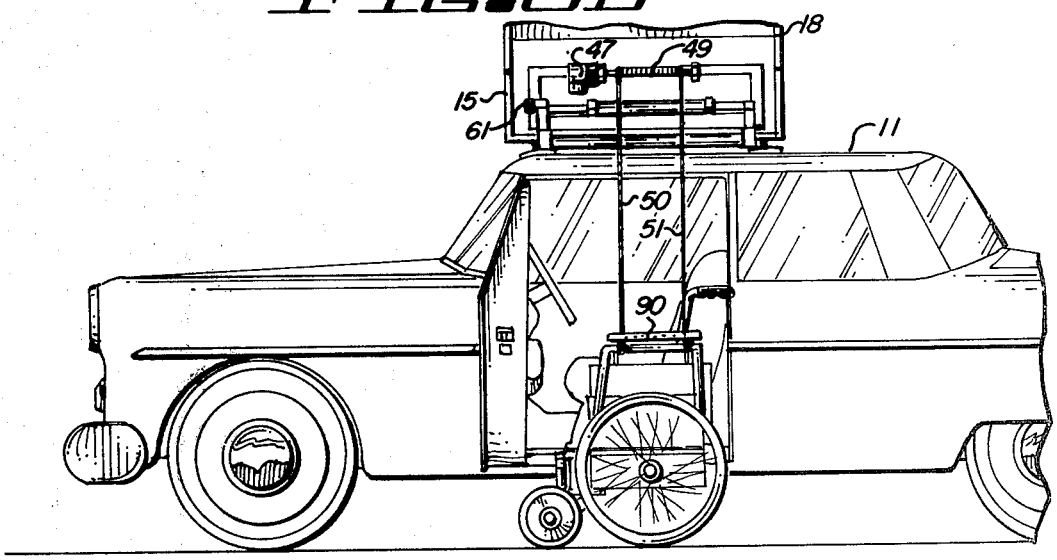

FIGS. 8A, 8B and 9, show the various locations of the wheelchair as it is loaded and unloaded adjacent the driver's seat of the vehicle.

The inwardly turned hook members 98 and 99 (FIG. 1) serve a dual purpose. As described above, they serve as an abutment for the bar 90 when that bar is used to close or lower the lifting frame 56, 58 and 59. These hook members 98 and 99 also help to grasp the bar 90 and pull it into position, so that the wheelchair which is attached to the bar 90 by the hooks 91 and 92 does not slip during the loading operation. These hooks 98 and 99 are shaped; so that when the lifting frame 56, 58 and 59 reaches the positions shown in FIGS. 2C and 2D, the bar 90 and the load which it carries, swing out of engagement with the hooks. This permits the bar to freely drop downwardly to unload the wheelchair.

Figure 3:
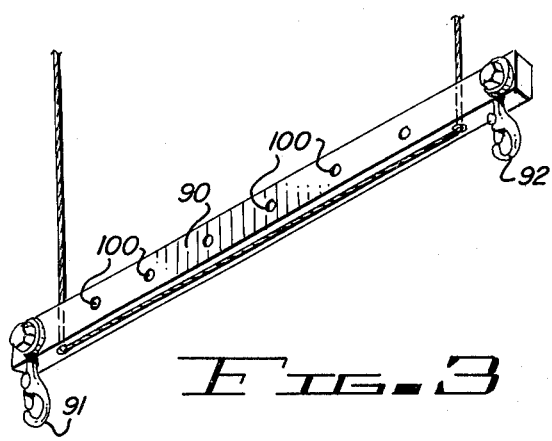
FIG. 3 is a detailed view of a portion of the apparatus shown in FIGS. 1 and 2.

FIG. 3 illustrates details of the bar 90 and the manner in which the cables 50 and 51 are attached to it. Actually, the cables 50 and 51 are part of a single continuous cable which is looped through the bar 90. This permits relative adjustments of the length of the cables 50 and 51 to be readily effected by rocking the bar 90 in one direction or the other until it is level, as a wheelchair or other object is loaded or unloaded from the device. In addition, the hooks 91 and 92 which are used to attach the bar to a load can be placed at different positions along the bar 90 to adjust their locations to different attachment points for different makes of wheelchairs or other objects to be loaded. To facilitate this adjustment, the bar 90 has a number of holes 100 formed through it at spaced intervals along its length, so that the bolts holding the hooks 91 and 92 can be released and reinserted through different ones of these spaced holes 100 as required by different loads.

Figure 6:
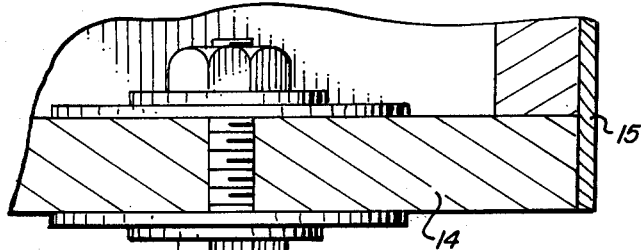
FIG. 6 is a detailed representation of the manner in which the apparatus of FIG. 1 is mounted on the roof of a vehicle.

FIG. 6 shows the details of the mounting supports 12 which are used to attach the base 14 of the enclosure for the loading apparatus to the top 11 of the vehicle with which it is used. Since different models of vehicles within any particular make all have different roof configurations, it is necessary that the mountings 12 are capable of accomodating different slopes and roof configurations. To accomplish this, each of the mountings 12 is a ball and swivel type of mounting which is simply formed by a convex upper flange member 105 attached to the roof 11 of a vehicle by suitable self-tapping screws or other threaded fasteners. The central portion of the part 105 has a hole 107 in it, and this hole accomodates the shaft 110 of an adjustment bolt which has a ball-shaped head 111 on it. This head is located in the space between the vehicle roof 106 and the part 105, and the hole 107 is large enough to permit pivoting or rocking of the shaft 110 relative to the part 105, so that each of the mountings 12 can be mounted on flat or curved portions of the roof of the vehicle. Vertical adjustment or leveling of the platform 14 is effected by means of the nuts 112 and 113 in a conventional manner.

Figure 7:
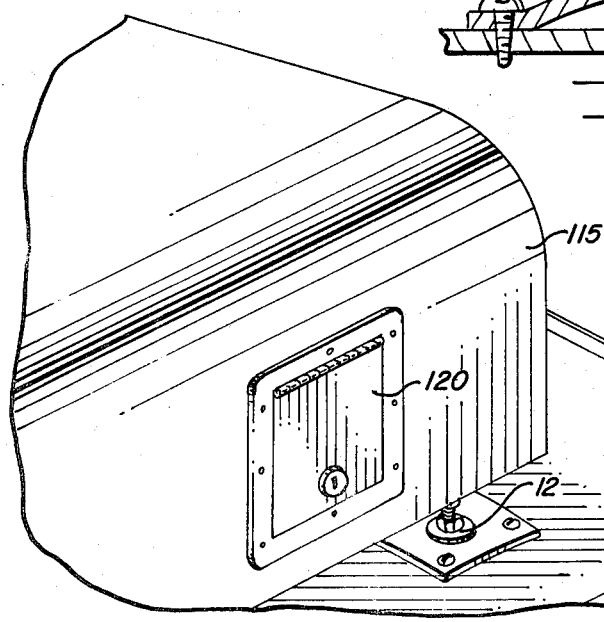
FIG. 7 shows a portion of the reverse side of the cover of the apparatus shown in FIG. 1.

FIG. 7 shows a detail of the reverse side of the loader housing shown in FIG. 1 to illustrate a key locked door 120 which is provided in the housing 115 adjacent the controls for the motor 47. This door permits access to the motor 47 and the shaft 49 to allow manual operation of the shaft 49 to either release the cables 50 and 51 to unload a wheelchair from the apparatus or to permit the cables to be pulled inwardly to load the apparatus and close it in the event there is an electrical failure in the vehicle or a failure of the motor 47 itself to operate.

The foregoing description has been limited to a preferred embodiment of the invention, which, however, is considered to be merely illustrative of the principles of the invention and not limiting of the true scope of the invention. Various modifications and equivalent applications of the concepts of this invention will occur to those skilled in the art without departing from the true scope of the invention as set forth in the following claims.

I claim:

1. A loader adapted to be mounted on the top of a motor vehicle for raising objects from alongside the vehicle to its top and for lowering objects from the top of the vehicle to the ground alongside the vehicle, the loader including in combination:

frame means for supporting objects and having a fixed portion and an extendible portion movable from a non-extended position to an extended position to extend outwardly from the loader to a position above a location on the ground alongside a vehicle when the loader is mounted on the top of a motor vehicle;

first means attachable to objects for lowering and raising such objects from the loader;

control means connected to said first means and the extendible portion of said frame means for operating said first means and the extendible portion of said frame means in synchronism with one another to load objects into the loader and unload objects from the loader;

second means attached to the extendible portion of said frame means for lifting objects from said frame means to position such objects for lowering and raising such objects from the loader; and said second means comprising a generally U-shaped lifting member, the open end of which is pivotally mounted to the extendible portion of said frame means adjacent its outer extremity and further including spring biasing means for pivoting upwardly the closed end of said lifting member from a closed position substantially parallel to the plane of said frame means to an extended position above the plane of said frame means.

2. The combination according to claim 1 wherein the extendible portion of said frame means has a roller mounted thereon for engaging objects loaded by the loader, and the closed end of said lifting member is spaced from said roller when said lifting member is in its closed position, so that objects to be loaded and unloaded from the loader extend across the roller on the extendible portion of the frame means and the closed end of said lifting member.

3. The combination according to claim 1 wherein said control means includes a cable and a mechanism for winding up and extending said cable, and said cable extends over the closed end of the lifting means for attachment to objects to be loaded and unloaded from said loader.

4. The combination according to claim 1 further including releasable holding means for holding the extendible portion of said frame means in the extended position while ojects are loaded into the loader until such objects engage said lifting member to permit winding up of said cable to act against the spring bias of said lifting member to fold it downwardly into the plane of said frame means with movement of said lifting member from its extended position to its closed position, releasing said holding means to thereupon permit further winding up of said cable to pull the object and the extendible portion of said frame means into its unextended position, thereupon loading objects into the loader.

5. The combination according to claim 1 wherein said frame means has a channel guide means and said lifting member has a mating guide member attached thereto for engaging said channel guide means when said lifting member is moved from its extended position to its closed position and the extendible portion of said frame member is pulled into its unextended closed position by said cable.

* * * * *